(12) United States Patent
Maffeis

(10) Patent No.: US 6,471,200 B2
(45) Date of Patent: Oct. 29, 2002

(54) SYSTEM FOR GUIDING THE JAWS IN GRIPPERS OPERATED BY A FLUID

(75) Inventor: Giuseppe Maffeis, Roncadelle (IT)

(73) Assignee: Gimatic S.p.A. (IT)

( * ) Notice: Subject to any disclaimer, the term of this patent is extended or adjusted under 35 U.S.C. 154(b) by 30 days.

(21) Appl. No.: 09/760,523

(22) Filed: Jan. 12, 2001

(65) Prior Publication Data
US 2001/0015517 A1 Aug. 23, 2001

(30) Foreign Application Priority Data
Nov. 2, 2000 (IT) .......................... BS20A0007

(51) Int. Cl.$^7$ ................................ B23Q 3/08
(52) U.S. Cl. ........................... 269/34; 269/234
(58) Field of Search ................ 269/34, 252, 253, 269/234, 32

(56) References Cited

U.S. PATENT DOCUMENTS

| | | | | |
|---|---|---|---|---|
| 2,634,175 A | * | 4/1953 | Kennedy | 269/253 |
| 3,170,322 A | * | 2/1965 | Cavanaugh | 269/234 |
| 4,294,444 A | * | 10/1981 | Horton | 269/34 |
| 4,448,406 A | * | 5/1984 | Hallberg et al. | 269/252 |

* cited by examiner

*Primary Examiner*—Robert C. Watson
(74) *Attorney, Agent, or Firm*—McGlew and Tuttle, P.C.

(57) ABSTRACT

A gripper includes a body, at least two jaws (11, 11'), which can move linearly on the body in opposite directions and at least one fluid-type piston (12, 12') that is arranged in the body and is intended to control the movements of the jaws. The jaws are supported and guided on said body with the interposition of at least one cylindrical bolt (26, 26') arranged in facing semicylindrical slots (27, 27') provided on one side of the jaws and in an adjacent part of the body.

9 Claims, 2 Drawing Sheets

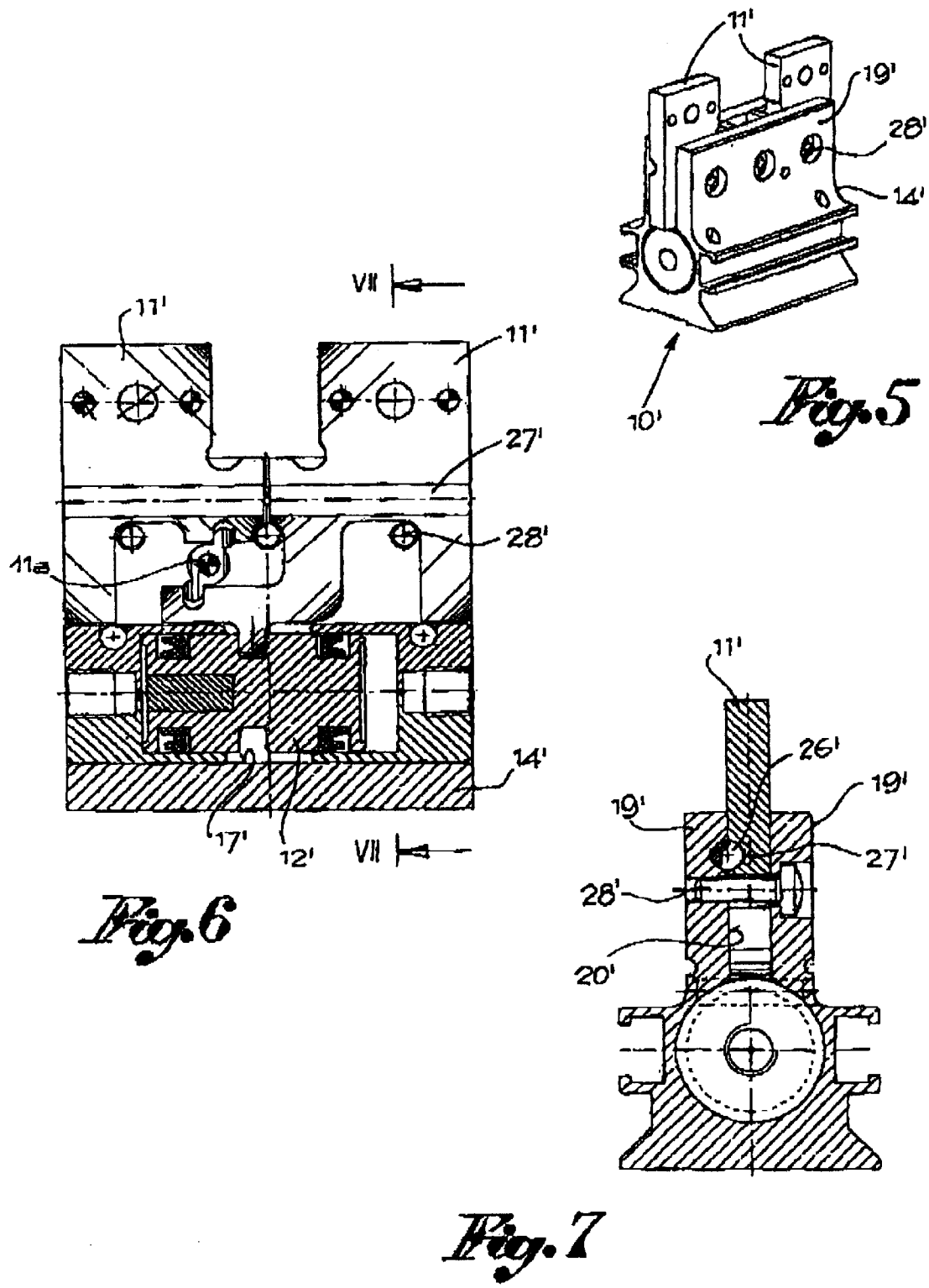

SYSTEM FOR GUIDING THE JAWS IN GRIPPERS OPERATED BY A FLUID

FIELD OF THE INVENTION

The present invention pertains to the field of grippers operated by a fluid, and it specifically pertains to an automatic gripper of the type that comprises a body, at least two jaws that can move linearly on said body in opposite directions by their action of pressing and releasing a piece, and at least one fluid-type piston for controlling the movements of the jaws via elements for connection with same.

BACKGROUND OF THE INVENTION

In such automatic grippers, the body and jaws have an especially complicated, burdensome design also because of having to resort to the preparation and to the insertion of profiled gibs for a coupling of the jaws with the body and guiding of the jaws in their opening and closing movements. In addition, the adjustment and recovery of the coupling clearances to be made by means of the gibs is always problematic and not always precise.

SUMMARY AND OBJECTS OF THE INVENTION

One object of the present invention is to solve the above-mentioned problems of the prior-art fluid-type grippers using a novel arrangement and combination of the elements and with the implicit advantages of eliminating the building and insertion of profiled gibs, facilitating the adjustment of the coupling clearances and wear between the body and the jaws and simplifying the structure of the grippers, making it possible to reduce their overall obstacles with the performances being equal as well.

Another object of the present invention is to provide a fluid-type gripper having at least one sliding guide that is contained between the body and the jaws and that makes it possible to adjust the clearances with screws engaging the body transversely without interference with the movements of the jaws.

Another object of the present invention is to provide a fluid-type gripper whose body at least in part can be profiled and obtained even from extrusion, therefore and advantageously without the need of significant machining.

Said objects and advantages are accomplished with a system for guiding the jaws in fluid-type grippers comprising a body, at least two jaws, which can move linearly on the body in opposite directions due to their action of pressing and releasing a piece, and at least one fluid-type piston arranged in the body and intended to control the movements of the jaws by means of connection with same. The jaws are supported and guided on the body with the interposition of at least one cylindrical bolt arranged in the facing semicylindrical slots provided on one side of the jaws and in an adjacent part of the body.

Thus, at least one cylindrical bolt having a simple design, made of a suitable material and/or treated appropriately, arranged in semicylindrical slots provided on the facing sides of the body and of the jaws, is used as a guide of the jaws in the body of the gripper. The adjustment and recovery of the clearances between the coupled elements are performed finely with screws that connect two parallel and opposite portions of the body, bringing them closer to the jaws as needed.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a perspective view of a gripper according to another embodiment;

FIG. 6 is a longitudinal sectional view of the gripper of FIG. 5 parallel to its base; and FIG. 7 is a cross sectional view according to the arrows VII—VII of FIG. 6.

DESCRIPTION OF THE PREFERRED EMBODIMENTS

Figure 1:
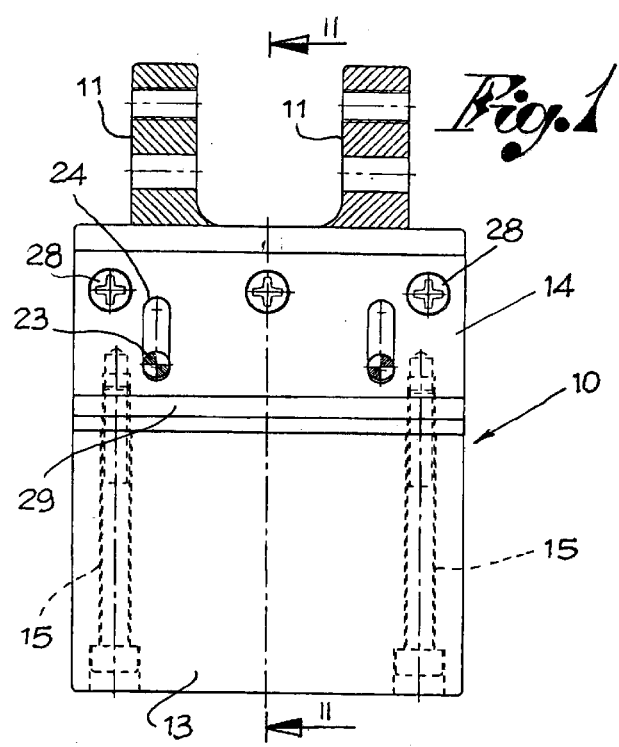
FIG. 1 is a front view sectional view of the gripper according to a first embodiment and with only the jaws.

Referring to the drawings in particular, the gripper shown essentially comprises a body 10, two pressing jaws 11, as well as a fluid-type piston 12 for controlling the jaws.

Figure 2:
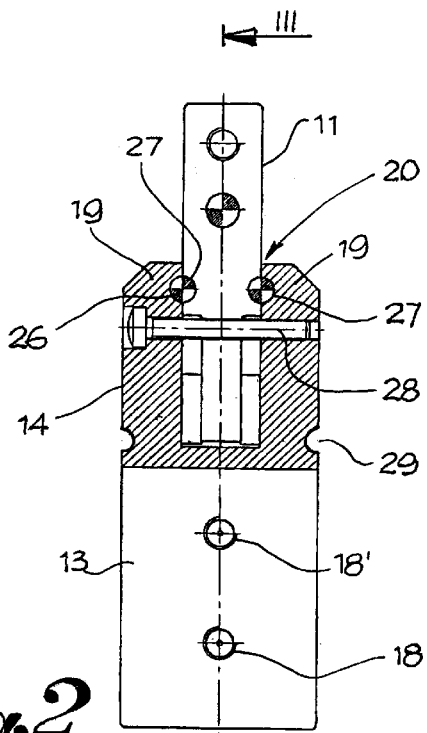
FIG. 2 is a sectional view of the gripper according to the arrows II—II of FIG. 1.
Figure 3:
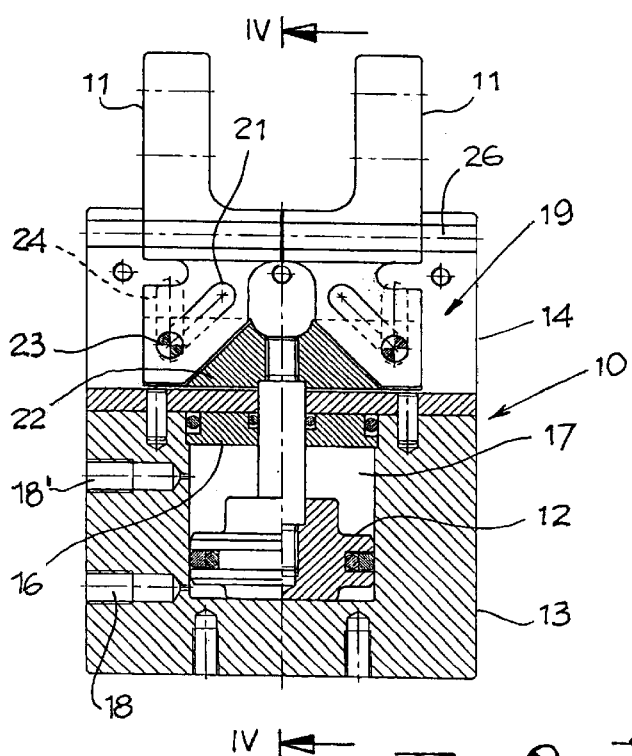
FIG. 3 is a sectional view of the gripper according to the arrows III—III of FIG. 2.
Figure 4:
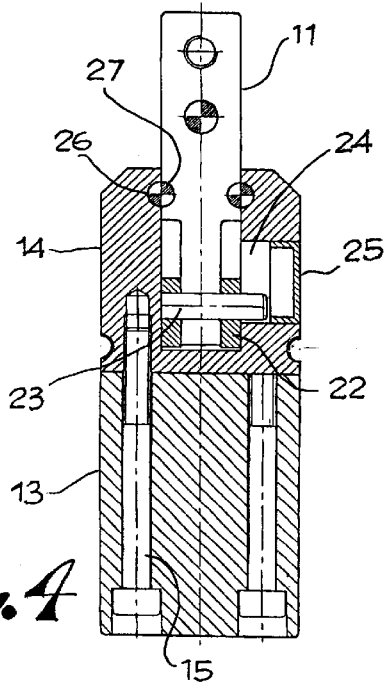
FIG. 4 is another sectional view of the gripper according to the arrows IV—IV of FIG. 3.

In the embodiment of FIGS. 1–4 the body 10 is composed of two parts: a base 13 and a top element 14, which are superimposed and are fixed to one another by means of screws 15. Together, and by means of an inserted sealing flange 16, the two components 13 and 14 of the body 10 delimit a chamber 17 for accommodating and guiding the fluid-type piston 12. As shown in the drawings, this can be for a dual purpose, and thus, the chamber 17 is fed with the fluid alternately by means of two holes 18, 18' at different levels in relation to the piston. Or else, the piston may have a single purpose, thus stressed by a spring acting in opposition to the action of the fluid fed by only one part of the piston.

The top element 14 of the body 10 can be obtained from machining or more advantageously from an extruded profile. In cross section this has an essentially U shape with two parallel wings 19 that delimit a channel 20 between them. The jaws 11 are inserted and can move linearly in the channel 20 in opposite directions to one another, and to each of these may be fixed a clamp (not shown), which is interchangeable and compatible with the shapes of the piece to be picked up and moved.

For their movements, the jaws 11 each have a slit 21, which is usually inclined 45°, and they are moved by an actuator 22 which is fixed and movable with the piston 12. Even the actuator 22 is arranged in the channel 22 and is moved between the jaws in a direction perpendicular to the plane of movement of same. The actuator 22 carries two entrainment pins 23, each of which is forced into the inclined slit 21 of a respective jaw and into a slot 24 provided in the top element, which is parallel to the direction of movement of the piston and is closed towards the outside by a plug 25.

In their linear movements, the jaws 11 are guided in the channel 20 on at least one bolt 26 made of treated steel, which is arranged between one side of the jaws proper and the adjacent wing of the top element 14.

In the example of FIG. 14 the jaws are guided by two bolts 26 arranged on opposite sides of the jaws, between these and the internal face of the wings 19 of the top element 14.

In the embodiment of FIGS. 5–7, the gripper has a body 10' composed of a single profiled piece 14' with two parallel wings 19' delimiting a channel 20' between them; the two jaws 11' are inserted and slide in the channel with the interposition of a bolt 26' accommodated in facing slots 27', the fluid-type piston 12' is arranged here in a corresponding chamber 17', which is plugged at the end provided in the body 10' in parallel to the direction of movement of the jaws. The piston 12 is connected and directly controls one of the jaws, which in its turn controls the other one by means of an inserted oscillating lever 11a. In this embodiment as well the clearances between the jaws and the body with the interposition of the guiding bolts 26' can be positioned and adjusted by means of adjustment screws 28' connecting the two wings 19' of the body.

Advantageously, each bolt 26, 26' is arranged in semicylindrical slots 27 provided on facing sides of the jaws 11, 11' and of one wing 19, 19' of the element.

The preparation and assembly of the components of the gripper described above are simple and easily carried out. Finally, it should be noted that the coupling and sliding clearances between the jaws and the wings of the top body may be varied and adjusted at any time, even after wear, by means of adjustment screws connecting the wings transversely (FIGS. 2 and 7) in order to close them to varying degrees, making use of their relative elasticity, an elasticity that can be increased, if required, by making a weakening groove on the external face of each wing at the level of its base.

While specific embodiments of the invention have been shown and described in detail to illustrate the application of the principles of the invention, it will be understood that the invention may be embodied otherwise without departing from such principles.

What is claimed is:

1. A gripper comprising:
   a body;
   two jaws movable linearly on said body in opposite directions to provide the action of pressing and releasing a piece;
   a fluid-type piston arranged in said body;
   a piston to jaws connection for controling the movements of said jaws; and
   at least one cylindrical bolt arranged in facing semicylindrical slots provided on one side of said jaws and in an adjacent part of said body, said jaws being supported and guided on said body with an interposition of said at least one cylindrical bolt.

2. A gripper in accordance with claim 1, further comprising another cylindrical bolt wherein said jaws are supported and guided on said cylindrical bolts, each arranged on opposite sides of the jaws in said facing cylindrical slots provided in each side of the jaws and in parts of said body that are adjacent to the sides of the jaws.

3. A gripper in accordance with claim 1, wherein said body includes a base and a top element, which are superimposed, fixed to one another and together delimit a chamber for said fluid-type piston, said top element having two parallel wings which delimit a channel between them, said jaws being inserted and movable in said channel.

4. A gripper in accordance with claim 2, wherein said body includes a base and a top element, which are superimposed, fixed to one another and together delimit a chamber for said fluid-type piston, said top element having two parallel wings which delimit a channel between them, said jaws being inserted and movable in said channel, each cylindrical bolt being arranged between one side of said jaws and an internal face of an adjacent wing.

5. A gripper in accordance with claim 1, wherein said jaws are guided on said bolt arranged in slots between one side of the jaws and in a part of the body that is adjacent to said side of said jaws.

6. A gripper in accordance with claim 5, further comprising an oscilating element, wherein said body includes a profiled element delimiting a chamber for a fluid-type piston and having two parallel wings, which delimit between them a channel, said jaws being inserted into said channel, said fluid-type piston being axially parallel to a direction of movement of said jaws, a first jaw being controlled by said piston directly and a second jaw being dragged along by said first jaw via said oscillating lever.

7. A gripper in accordance with claim 1, wherein said body is formed of parts including at least one part obtained from an extruded profile.

8. A gripper in accordance with claim 1, wherein said body includes a profiled element delimiting a chamber for a fluid-type piston and having two parallel wings said wings being connected transversely by adjustment screws for adjusting clearances between the jaws and the wings of the top element with inserted bolts.

9. A gripper in accordance with claim 6, wherein each wing has an outer elasticizing groove.

* * * * *